United States Patent

Landefeld

[15] 3,644,827
[45] Feb. 22, 1972

[54] FREQUENCY SYNTHESIZER METHOD FOR ADDING MIXED HARMONICS WHICH CORRESPOND TO SIGNIFICANT DIGITS OF THE SYNTHESIZED FREQUENCY

[72] Inventor: Edgar E. Landefeld, 1135 Durham Cir., Massillon, Ohio 44646

[22] Filed: May 27, 1969

[21] Appl. No.: 828,241

[52] U.S. Cl. ............................................324/79 R, 331/39
[51] Int. Cl. .................................G01r 23/14, H03b 21/00
[58] Field of Search ...................324/79; 331/39; 325/67, 363

[56] References Cited

UNITED STATES PATENTS 3,235,815   2/1966   Keicher ....................................331/39
3,512,089   5/1970   Cushmaman ........................324/79 X

OTHER PUBLICATIONS

H. J. Finden; J. Inst. Elec. Engr. 12–12–43; pgs. 165–180.

*Primary Examiner*—Alfred E. Smith
*Attorney*—Anthony D. Cennamo

[57] ABSTRACT

A method of synthesizing a series of frequencies from a single source utilizing the process of moving the individual frequencies upward in the frequency spectrum before they are mixed. Specifically, a standard crystal controlled frequency and its harmonics are used to provide frequency and deviation measurement means for a frequency modulated (FM) signal.

4 Claims, 1 Drawing Figure

PATENTED FEB 22 1972 3,644,827
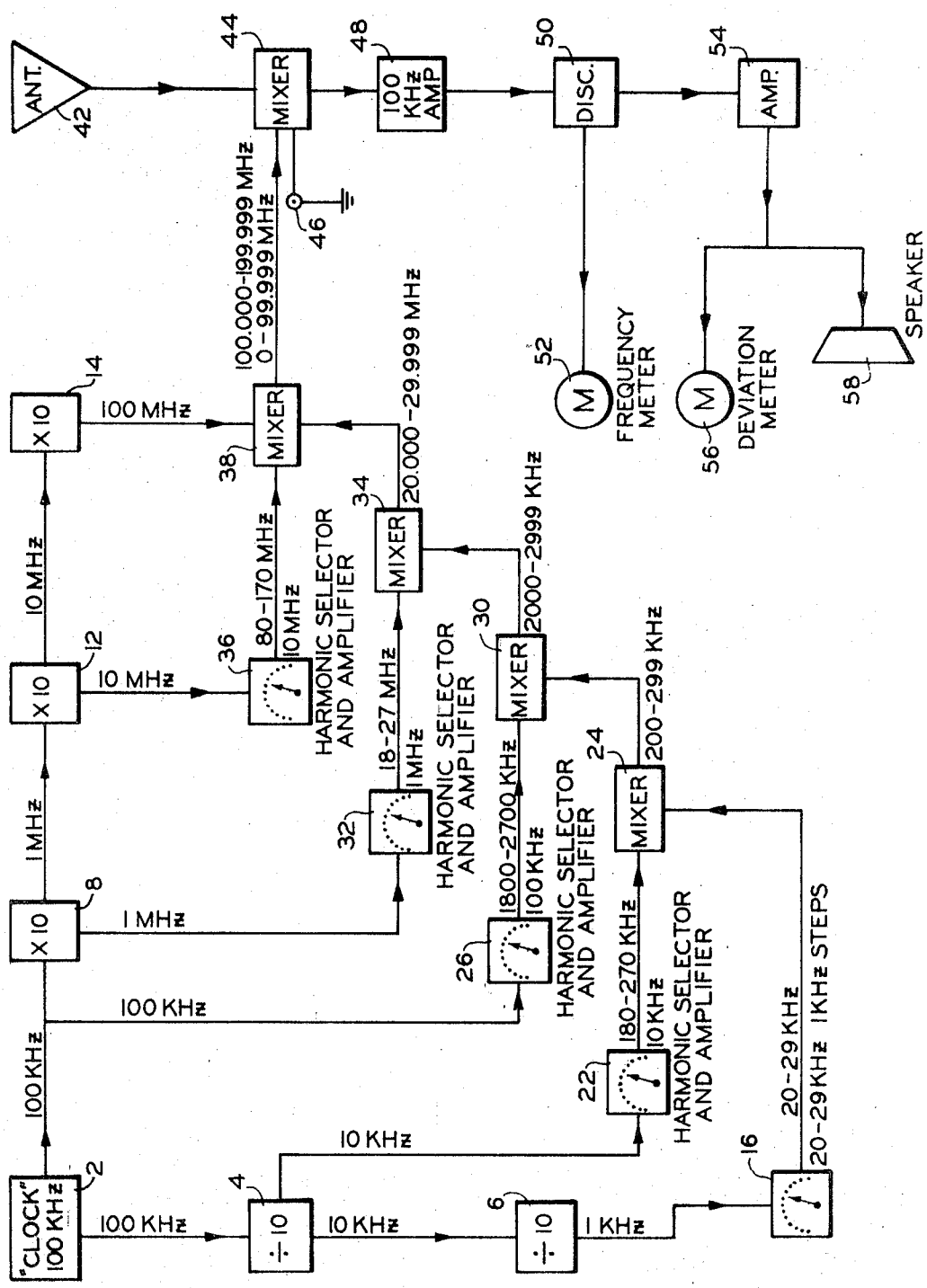
INVENTOR.
EDGAR E. LANDEFELD
BY
ATTORNEY

FREQUENCY SYNTHESIZER METHOD FOR ADDING MIXED HARMONICS WHICH CORRESPOND TO SIGNIFICANT DIGITS OF THE SYNTHESIZED FREQUENCY

BACKGROUND

Two-way communication systems are utilized by many persons in many walks of life. This high use has necessitated strict control regulations by the Federal Communications Commission (FCC). The FCC has assigned frequencies to the operators of these communication systems. Operators must maintain their systems within prescribed frequency and deviation limits. The assigned frequency is the unmodulated carrier frequency and is required to be held to within 0.005 percent (typically, varies with frequency assignments). Deviation, as used in the industry, is the maximum *change* in frequency under modulation. Thus, with 5 kHz. deviation, the transmitter frequency would vary from 5 kHz. higher than the assigned frequency to 5 kHz. lower than the assigned frequency, for a total bandwidth of 10 kHz.

Due to the mobile nature of the two-way communication systems and the large number of assigned frequencies, there has existed a great need for a portable test instrument which could accurately measure and calibrate the frequency and deviation of the FM transmitter units. Such a test instrument must also be capable of producing an output signal at the assigned frequency in order to calibrate the receiver portion of the two-way system. Prior art instruments which were designed to meet these requirements were either inaccurate, complex, expensive or not portable.

As an illustration of the difficulties encountered in designing adequate test equipment for the two-way communication systems consider the problems inherent in what would appear to be the simplest method of synthesizing a series of frequencies. A basic standard or "clock" frequency can be multiplied and divided by factors of 10 to produce fundamental frequencies of 1, 10, 100, 1000, etc., kHz. Harmonics of each of these may readily be produced to provide ranges of 0–9 kHz., 0–90 kHz., etc. Direct mixing of these frequencies is very attractive, for example, a frequency of 2,355 kHz. may be produced by selecting 5 on the 1 kHz. range (5 kHz.), mixing it with 50 kHz. from the tens range to produce 55 kHz., mixing this with 300 on the hundreds range to produce 355 kHz., and mixing this with 2,000 on the 1 mHz. range, for a sum frequency of 2,355 kHz.

This simple approach is unworkable in practice, however. Consider a desired frequency of 1,001 kHz. which would require that a 1 kHz. signal be mixed with a 1 mHz signal. The resultant mixing products would be the two original frequencies of 1 kHz. and 1 mHz, plus the sum and difference components of 1,001 kHz. and 999 kHz. It is possible to reduce the amplitude of one of the original frequencies in the output by means of a balanced modulator, but there is no simple way to eliminate the 999 kHz. difference frequency except by some type of wave filter means. The selectivity of wave filters, (their ability to select a given frequency while rejecting another) is a percentage of the frequencies involved. In practice, when using inductance-capacitance (LC) circuits for wave filters, any unwanted frequencies should be removed by at least 10 percent from the desired frequency for satisfactory rejection. In the example above, the undesired frequency is removed by only 0.2 percent and would have essentially the same amplitude as the desired signal. This system is obviously unworkable.

SUMMARY

The present invention relates to a method of synthesizing a series of frequencies from a single source to facilitate the frequency and deviation calibration of two-way communication systems. Simple addition in conjunction with the process of moving blocks of frequencies up in the frequency spectrum is utilized to produce any desired frequency.

The invention "translates" each frequency to a higher frequency before mixing. "Translating" is defined as taking a series of frequencies, such as the 0–9 kHz. range, and moving them to a new, higher portion of the spectrum, in this situation, 20–29 kHz. This is different from multiplying, since multiplying the series 0, 1, 2, . . . 9 kHz. by 20 would result in a series 0, 20, 40, . . . 180 kHz. Translating moves the block of frequencies upward, but does not disturb the 1 kHz. spacing. The series becomes 20, 21, 22, . . . 29 kHz.

The translating performed in the preferred embodiment of the invention was by a factor of (2×10). The same principle discussed for the "units" also applies to the "tens," "hundreds," etc. By utilizing the method taught by the invention a series of frequencies are produced in which the undesired frequencies are sufficiently separated from the desired frequency so that wave filtering becomes practical and efficient. The translated frequencies are "unreal" frequencies by a factor of (2×10). After all the necessary frequency selection is performed the frequencies produced are converted to "real" frequencies for use in calibrating the two-way communication systems.

OBJECTS

Accordingly it is a principal object of the present invention to provide an improved FM frequency and deviation measurement means.

Another object of the invention is to provide an improved method of synthesizing a series of frequencies.

Still a further object of the invention is to provide an FM frequency and deviation measurement means which is portable and inexpensive.

A further object of the invention is to provide a method of synthesizing a series of frequencies which substantially simplifies the filtering of undesired frequencies from the desired signal.

BRIEF DESCRIPTION OF THE DRAWING

For a complete understanding of the invention, together with other objects and advantages thereof, reference may be made to the accompanying drawing in which:

The single FIGURE is a diagrammatic illustration, in block form, showing the preferred embodiment of the invention.

DETAILED DESCRIPTION OF THE DRAWING

Referring now to the drawing there is illustrated a block diagram of the preferred embodiment of the invention. The invention utilizes the superheterodyne theory of operation in a unique circuit configuration in which the local oscillator signal is provided by a frequency synthesizer which will generate any required frequency from a standard frequency source. The local oscillator signal thus generated is removed by a predetermined value from the dial-in frequency, resulting in a difference frequency equal to the predetermined value.

The amplified predetermined value of frequency signal, after being discriminated, is also applied to an alternating-current (AC) meter which is calibrated to indicate the deviation of the FM transmitter under modulation.

There is nothing unique in the circuitry which was utilized in the constructed embodiment and the functions performed by each of the individual blocks in the drawing may be accomplished by a conventional circuitry means.

The heart of the system is the frequency synthesizer. The "clock" or standard utilized in the preferred embodiment is a 100 kHz. crystal oscillator 2 which is quite stable and may be readily compared with any of the Standard Frequency transmissions of WWV, the National Bureau of Standards station, and adjusted to within a few cycles of the Standard Frequency transmissions.

The 100 kHz. "clock" frequency is divided by multivibrator divider circuit 4 by 10 to provide an output of 10 kHz. This 10 kHz. is again divided 6 by 10 to provide an output of 1 kHz.

The 100 kHz. "clock" frequency is also multiplied by 10 in an harmonic amplifier 8 to provide a 1 mHz. output.

The 1 mHz output is multiplied 12 by 10 to produce a 10 mHz output, and this, in turn, is multiplied 14 by 10 to produce a 100 mHz output.

The basic clock frequency may be multiplied and divided by any conventional electronic circuit means to make available outputs at 1 kHz., 10 kHz., 100 kHz., 1 mHz, 10 mHz, 100 mHz. It is not intended to limit the invention by the use of multivibrator divider circuits or harmonic amplifier circuits in the constructed embodiment.

The 1 kHz. output is used to control a conventional free-running oscillator 16, the frequency of which can be adjusted by means of a selector switch from 20 to 29 kHz. in 1 kHz. steps. Injecting the 1 kHz. energy "locks" this oscillator 16 to the respective harmonic of the injected frequency to stabilize it. This is the "units" signal, each "unit" being 1 kHz. Note that "0" kHz. is actually a 20 kHz. signal, and that 9 kHz. is represented by a 29 kHz. signal. In this preferred embodiment a free-running oscillator was used. Other circuits, however, could have been utilized for instance, an LC circuit to select the 20-29th harmonic from the 1 kHz. outputs.

The 18th thru the 27th harmonic of the 10 kHz. output is selected and amplified by the "tens" selector switch 22, "0" producing 180 kHz. and "9" producing a 270 kHz. output. This output is mixed 24 by any conventional frequency mixing means with the output of the "units" generator 16, the sum frequency being selected. Thus, if both are on "0," 20 kHz. from the "units" is mixed with 180 kHz. from the "tens," the sum of which is 200 kHz., which represents "00." If both switches had been set to "9," a 29 kHz. signal would have been mixed with a 270 kHz. signal to produce a signal of 299 kHz., which would represent 99. Note that a "2" appears to the left of the dialed-in figure in each output.

The 18th thru the 27th harmonic of the 100 kHz. oscillator is selected and amplified by the "hundreds" selector switch 26, resulting in outputs of 1,800 to 2,700 kHz. This is mixed 30 with the output of the "tens" mixer, the sum frequency being again the dialed-in frequency, with a "2" to the left, in the thousands position.

The 18th thru the 27th harmonic of the 1 mHz output is selected and amplified by the "thousands" selector switch 32, resulting in outputs of 18 to 27 mHz. This, when mixed 34 with the output of the "hundreds" mixer, again results in the dialed-in frequency, but again with a "2" off to the left. Note that a frequency of four digits can now be selected, but that the selected frequency will be translated to the 20 mHz range, and lie in the range of 20.000 to 29.999 mHz.

The 8th through the 17th harmonic of the 10 mHz output is selected and amplified by the "10 m" selector 36 to provide an output from 80-170 mHz. This is mixed 38 with the output of the "thousands" mixer to provide a sum frequency of 100-199.999 mHz. Note that the figure to the left is now a "1" rather than a "2," so that the five dialed-in frequencies have had 100 mHz added to them, rather than 200 mHz. This change was due to limitations of the test gear available for the constructed model of the preferred embodiment and no principle is involved.

Recapitulating, five selector switches are available reading from 00,000 kHz. to 99,999 kHz. with the resulting output to 100 mHz to 199,999 mHz. This range is directly useful in "-high-band" mobile maintenance, the frequency assignments of which are 152-174 mHz. Thus, the sixth selector switch, for 100 mHz increments, may be set on "1" at this time, but does nothing.

The output which is generated in the 100 mHz range is now combined in a mixer 38 with the 100 mHz output of an harmonic amplifier 14, with the *difference* frequency being selected. This translates the 100-199,999 mHz output of the "10 m" mixer 38 to 000.000 to 099.999 mHz, and provides output fort the "low-band" assignment from 25-50 mHz. (Actually, the total range of frequencies is available, and could be used.) In this mode, the 100 mHz selector switch would read "0," showing the output had "0" hundreds of mHz. Harmonic selection and amplification of the 100 mHz harmonic amplifier 14 would enable one to translate the five digits to the 400 mHz or 900 mHz range but this was not done in the constructed embodiment.

As described earlier, the dialed-in frequency is 100 kHz. different from the actual output, so that the signal being checked is mixed to produce a difference frequency of 100 kHz. If the transmitter is exactly on frequency, the difference frequency will be exactly 100 kHz. Should the transmitter be 1 kHz. low, the difference frequency will be 99 kHz., which would be indicated on the meter as being 1 kHz. low in frequency.

In the description of the frequency synthesizer, it was assumed that the dialed-in frequency would be generated, rather than one which was 100 kHz. lower than indicated. It is useful to have the indicated frequency generated also, for use in receiver alignment. This dual purpose is provided by arranging for 11 positions on the selector switch 26 for the 100 kHz. selection, with separate indexes for "measure" and "-generate." Using the "meansur" index causes the switch to be rotated counterclockwise one detent, or 100 kHz. Of course, the harmonic selection is now from 1,700-2,700 kHz., rather than 1,800-2,700 kHz. as indicated in the explanation.

The signal to be measured enters the system via an antenna 42 or other radio frequency connection means and is beat with the internally generated signal in a mixer circuit 44. The generated frequency signal may be emitted through a signal output terminal 46 in the receiver alignment mode of operation.

The difference frequency is amplified 48 in an amplifier having a bandpass of approximately 20 kHz. The difference frequency is discriminated 50 and passes to a frequency meter 52 which measures the difference value of the difference frequency from the 100 kHz. offset frequency.

The discriminated difference frequency is amplified 54 and is connected to an (AC) meter 56 which is calibrated to indicate the deviation of the FM transmitter under modulation. A speaker 58 is provided for an audible indication of the degree of deviation.

The following analysis provides a complete understanding of the theory underlying the operation of the invention disclosed herein.

As seen in FIG. 1 a series of "unit" (1 kHz.) steps is taken from 20-29 kHz. A series of "10" (10 kHz.) steps is taken from 180-270 kHz. This process is continued to the point where the steps are separated by 10 mHz quantities.

Using this system, the deviation of a 1,001 kHz. signal as discussed in the background of this application will be described. The 1 kHz. range is now 20-29 kHz., so dialing a "1" on this range will produce a signal of 21 kHz. The 10 kHz. harmonic range is from 180-270 kHz. Since the tens figure in 1,001 (the selected frequency) is "0," the lowest frequency will be selected, which is 180 kHz. Mixing 180 and 21 kHz. results in a sum frequency of 201 kHz. This figure represents the "01" of the figure selected, and is again "translated" to a higher frequency by a factor of (2×10). Thus, "01" is represented by 201 kHz. Note, however, that the unwanted carrier at 180 kHz., and the unwanted difference component at 159 kHz. can both be rejected by resonant circuits, as they are approximately 10 and 20 percent respectively removed from the desired frequency.

Setting the "hundreds" dial to "0" causes it to produce a signal at 1,800 kHz. This, when mixed with 201 kHz. gives a sum frequency of 2,001 kHz. Thus, the last three figures of the desired number are produced, proceeded by a "2," indicating that it, too, has been "translated" upwards by the factor (2×10). The 1,800 kHz. carrier and the 1,599 kHz. difference component are again 10 and 20 percent respectively removed from the desired frequency, so they can be rejected.

For the "thousands" figure, a "1" is dialed which gives an actual frequency of 19,000 kHz. This, when mixed with 2,001 kHz. gives a sum of 21,001 kHz. This is the desired frequency of 1,001 kHz., but "translated" upwards by (2×10). Unwanted mixer responses are again removed by the same percentages.

This description has gone only as far as the four significant figures in this example, due to the repetitious nature of the underlying theory. A significant principal of invention is that the frequencies produced are not the "real" figures that were asked for, but are "unreal" in that they have been translated upward by this factor of (2×10). Obviously they cannot be used in this form, but must be returned to a "real" figure at some time. This conversion is accomplished after all necessary selection is completed.

Translating upwards by a factor of 10 (1 kHz. range 10–19 kHz. etc.) would be the same principle, but reduces the separation of the unwanted components for certain digits. A factor of (3×10) is feasible, but requires greater care in the design of the harmonic amplifiers. The factor of (2×10) which is used is a compromise of design, and is not relevant so far as the principle is concerned.

Although certain and specific embodiments have been illustrated, it is to be understood that modifications may be made without departing from the true spirit and scope of the invention.

What is claimed is:

1. A method for synthesizing from a single frequency source, a desired frequency in a range of frequencies, said method comprising the step of:
   a. deriving a plurality of decimal based frequencies from a single frequency source, each decimal based frequency having first through ninth harmonics corresponding to the frequency represented by a different significant digit of said desired frequency,
   b. obtaining selected harmonics frequencies of said decimal based frequencies, each selected harmonic frequency being above and not including any of said first through ninth harmonics and corresponding to a different significant digit of said desired frequency, the selectable harmonics of each decimal based frequency continuously and in ascending order corresponding to the selectable digits, 0 through 9, for each significant digit and being translated to a frequency significantly higher than the frequency to which it corresponds;
   c. mixing the harmonic frequency corresponding to the least significant digit with the harmonic frequency corresponding to the next more significant digit and filtering out the carrier and the difference frequencies to provide a first sum frequency;
   d. mixing the first sum frequency with the harmonic frequency corresponding to the next more significant digit and similarly mixing each selected harmonic with the sum frequency derived from mixing the frequency corresponding to the next less significant digit with the sum frequency similarly derived from frequencies corresponding to lesser significant digits; and
   e. mixing the final sum frequency, derived from the frequency corresponding to the most significant digit, with one of said decimal based frequencies, to translate said sum frequency down to said desired frequency.

2. A method as set forth in claim 1 wherein said method further comprises the steps of displacing said desired frequency by a predetermined difference frequency, mixing said displaced desired frequency with a frequency signal to be measured, selecting the resulting difference frequency, amplifying said difference frequency, measuring the frequency value of said difference frequency, and measuring the deviation value of said difference frequency.

3. A method according to claim 1 wherein:
   said decimal based frequencies include decimal multiples and decimal quotients of said frequency source.

4. A method according to claim 3 wherein:
   said sum frequencies are at least the 20th harmonic (20 times) of the frequency they correspond to.

* * * * *